United States Patent
Yang

(10) Patent No.: US 7,370,353 B2
(45) Date of Patent: May 6, 2008

(54) SYSTEM AND METHOD FOR MANAGING DYNAMIC NETWORK SESSIONS

(75) Inventor: Xuechen Yang, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 10/011,601

(22) Filed: Nov. 5, 2001

(65) Prior Publication Data

US 2003/0088788 A1    May 8, 2003

(51) Int. Cl.
G06F 17/30 (2006.01)
G06F 17/00 (2006.01)

(52) U.S. Cl. .............................. 726/11; 726/12; 726/3

(58) Field of Classification Search ................ 713/153, 713/154; 709/227, 228, 229, 246, 249, 203; 370/401; 726/11, 12, 3
See application file for complete search history.

(56) References Cited

U.S. PATENT DOCUMENTS

| | | |
|---|---|---|
| 5,826,014 A | 10/1998 | Coley et al. |
| 5,828,833 A | 10/1998 | Belville et al. |
| 5,864,683 A | 1/1999 | Boebert et al. |
| 5,898,830 A | 4/1999 | Wesinger, Jr. et al. |
| 5,918,018 A | 6/1999 | Gooderum et al. |
| 5,944,823 A | 8/1999 | Jade et al. |
| 5,968,176 A | 10/1999 | Nessett et al. |
| 5,983,350 A | 11/1999 | Minear et al. |
| 6,003,133 A | 12/1999 | Moughanni et al. |
| 6,052,788 A | 4/2000 | Wesinger, Jr. et al. |
| 6,061,797 A | 5/2000 | Jade et al. |
| 6,061,798 A * | 5/2000 | Coley et al. ............. 713/201 |
| 6,088,796 A | 7/2000 | Cianfrocca et al. |
| 6,097,948 A | 8/2000 | Sjödin |
| 6,098,172 A | 8/2000 | Coss et al. |
| 6,141,749 A | 10/2000 | Coss et al. |
| 6,141,755 A | 10/2000 | Dowd et al. |
| 6,154,775 A | 11/2000 | Coss et al. |

OTHER PUBLICATIONS

Zwicky, E., "Chapter 15.7 RealAudio and RealVideo," Building Internet Firewalls, O'Reilly, Jun. 2001.*
ConSeal, "PC Firewall Technical Summary," 1999.*
Cisco Security Advisory: Cisco Secure PIX Firewall TCP Reset Vulnerability; Document ID: 13639; http://www.cisco.com/warp/public/707/cisco-sa-20000711-pix-tcp-reset.shtml; Revision 1.0 For Public Release year 2000.*
NetCallback 1.3.1 Forwarding TCP and UDP ports behind a firewall Copyright © 2001.*
RFC 3093—Firewall Enhnancement Protocol (FEP) Apr. 1, 2001.*

* cited by examiner

*Primary Examiner*—David Jung
(74) *Attorney, Agent, or Firm*—MacPherson Kwok Chen & Heid LLP; Tom Chen

(57) ABSTRACT

For an Internet Access Gateway operative between an area network and a public network, managing dynamic network sessions therebetween whereby a primary server on the public network in a primary session with a client of the area network initiates an additional session with an additional server on the public network, for which an unexpected data packet received at the gateway from the additional server is associated with the primary session, and accordingly allowed access to the area network through the gateway, provided the gateway received the data packet at an input port exceeding 1023, the additional session comprises a pre-defined Session Triggering Event, and at least one internal network component of the area network indicates willingness to receive the data packet. Wherefore, a preferred Application Level Gateway is thereby provided for firewall and NAT implementations to enhance network security.

22 Claims, 4 Drawing Sheets

SYSTEM AND METHOD FOR MANAGING DYNAMIC NETWORK SESSIONS

CROSS-REFERENCES TO RELATED APPLICATIONS

STATEMENT REGARDING FEDERALLY SPONSORED RESEARCH OR DEVELOPMENT

MICROFICHE APPENDIX

BACKGROUND OF THE INVENTION

1. Field of the Invention

The inventive arrangements pertain to computer security, and more specifically, to enhancing computer network security through improved management of dynamic network sessions.

2. Description of Related Art

The Internet comprises an interconnected and globally expansive network of networks through which information, files, and programs (i.e., data) are exchanged across various electronic pathways. Accessing the Internet generally comprises gaining access to these electronic pathways through an Internet Access Gateway ("IAG") or other Internet Access Device.

Unlike a circuit-switched network, such as a traditional phone line, in a packet-switched network, such as the Internet, no component of the network is dedicated exclusively to a specific sender and receiver for the duration of a session therebetween. Thus, insular and unbroken connections between the sender and receiver are not established across the network, and as a result, data packets are not transmitted and received sequentially along the electronic pathways. Rather, the Internet embraces a client-server model in which data packets are transmitted and received according to various protocols, including a Transmission Control Protocol ("TCP"), which breaks the data into data packets at a sender and reassembles them at a receiver, and an Internet Protocol ("IP"), which routes the data packets to the correct receiver.

According to the Ethernet, each individual data packet contains approximately 1,500 bytes and contains header information that is used to reassemble the data packets at the receiver, which generally arrive out of order by virtue of the various electronic pathways along which they traveled across the network. As the TCP creates each data packet, it also commonly calculates and adds to the header information a checksum, which is a number that is based on the packet size and content of the data packet, and used at the receiver to determine if the data packet was corrupted during transmission, whereupon retransmission is initiated if the checksum fails. Alternatively, for example, if streaming technologies retransmitted data packets based on failed checksums, retransmitted packets could bombard, overwhelm, and eventually interrupt a sound player at the receiver, significantly hampering effective audio and video playback. Thus, streaming technologies commonly use a connectionless User Datagram Protocol ("UDP") in which data packets are transmitted and received without regard to an end-to-end handshake such as a checksum.

Regardless, whether by TCP or UDP, the IP attaches addressing information to each data packet before placing each data packet into a virtual envelope. Addressing information is used to route each data packet from the sender to the receiver through the network, and it is generally identical for all data packets in a related data stream. It often contains the sender's and receiver's IP addresses, the amount of time to retain the data packet, a preferred number of hops the data packet can take en-route, and other such information. Although addressing information commonly comprises the first line of the data packet, it can also comprise a specified number of bytes at a specified location within the packet.

A session between a client and server usually begins with a service request transmitted from the client to the server. During this session, the server services the request whereupon multiple messages are commonly exchanged between the client and the server throughout the session. The session terminates if either the client or server terminates its connection to the other. However, it has become commonplace in certain protocols for a primary session with a primary server to generate one or more additional sessions with one or more additional servers and the client. If the client resides behind a firewall or utilizes Network Address Translation ("NAT"), acceptance of non-requested data packets from the additional servers could compromise the client's security policies.

Due to the inherently dynamic nature of plural sessions, however, managing dynamic network sessions is not easily accomplished. For example, in this context, many IAGs suffer from one or more of the following shortcomings: failure to recognize proper relationships between primary sessions and additional sessions; forced firewall and/or NAT disablement if enabled; reconfigured firewalls to allow all data packets to pass in order to prevent discrimination against additional session data packets, thereby decreasing firewall effectiveness; inspecting the entire contents of the data packet instead of the header and addressing information; and implementing complex protocol decoders to negotiate new ports for the additional sessions. Accordingly, prior art solutions are unsatisfactory. They significantly increase memory requirements, retard throughput, and require patching, upgrading, or reinstalling the IAG each time a new protocol is deployed that is capable of generating plural sessions. Moreover, security can be compromised for IAGs that inspect the contents of each data packet. For example, if the IAG uses information contained in the body of the data packet to dynamically reconfigure the firewall or perform NAT—such as opening a firewall port or creating NAT port mappings—mischievants can proactively attack the IAG by constructing protocol messages that contain malicious information. When malicious information cannot be distinguished from non-malicious information, the IAG remains vulnerable to attack. What are needed, therefore, are universally applicable systems and methods for effectively and efficiently managing dynamic network sessions at an IAG.

While numerous objects, advantages, and aspects of the present invention will become apparent from the following description, reference is made in the description to the accompanying drawings which form a part hereof, and in which there is shown, by way of illustration, a preferred embodiment of the present invention. Such embodiment does not represent the full spirit or scope of the invention, however, and reference must also be made to the claims herein for properly interpreting the spirit and scope of this invention.

BRIEF SUMMARY OF THE INVENTION

The invention comprises a system and method operative at an IAG that operates between an area network and a public network. The inventive arrangements permit processing a dynamic network session between these networks, for example, when a primary server in a primary session with a client in the area network initiates an additional session with an additional server that the IAG would not otherwise be expecting. The invention permits the IAG to accept data packets received from the additional server as if received from the primary server, whereby the primary session and additional session are treated as a single group. This permits plural sessions to be conducted with the client without compromising the client's security. It also permits the additional sessions to be conducted without needing to inspect every protocol message. Instead of inspecting every new protocol message, the ascertains whether certain internal components will accommodate the new sessions by tracking their protocol status. The IAG maintains information about each internal component and uses it to determine whether a new session is associated with a currently active primary session. If the additional session is legitimate, the IAG access policy associated with the primary session is then applied to the secondary session. Thus, the invention provides a general solution for all special protocols that can generate plural and streaming sessions. It eliminates the need to upgrade the IAG after initial deployment and releases system administrators from the often burdensome upgrading and maintenance tasks associated with prior art solutions. The IAG also eliminates the need to monitor and decode the contents of each data packet, resulting in more secure gateway that yields better throughput with less hardware costs and memory requirements.

DETAILED DESCRIPTION OF THE INVENTION

Figure 1:
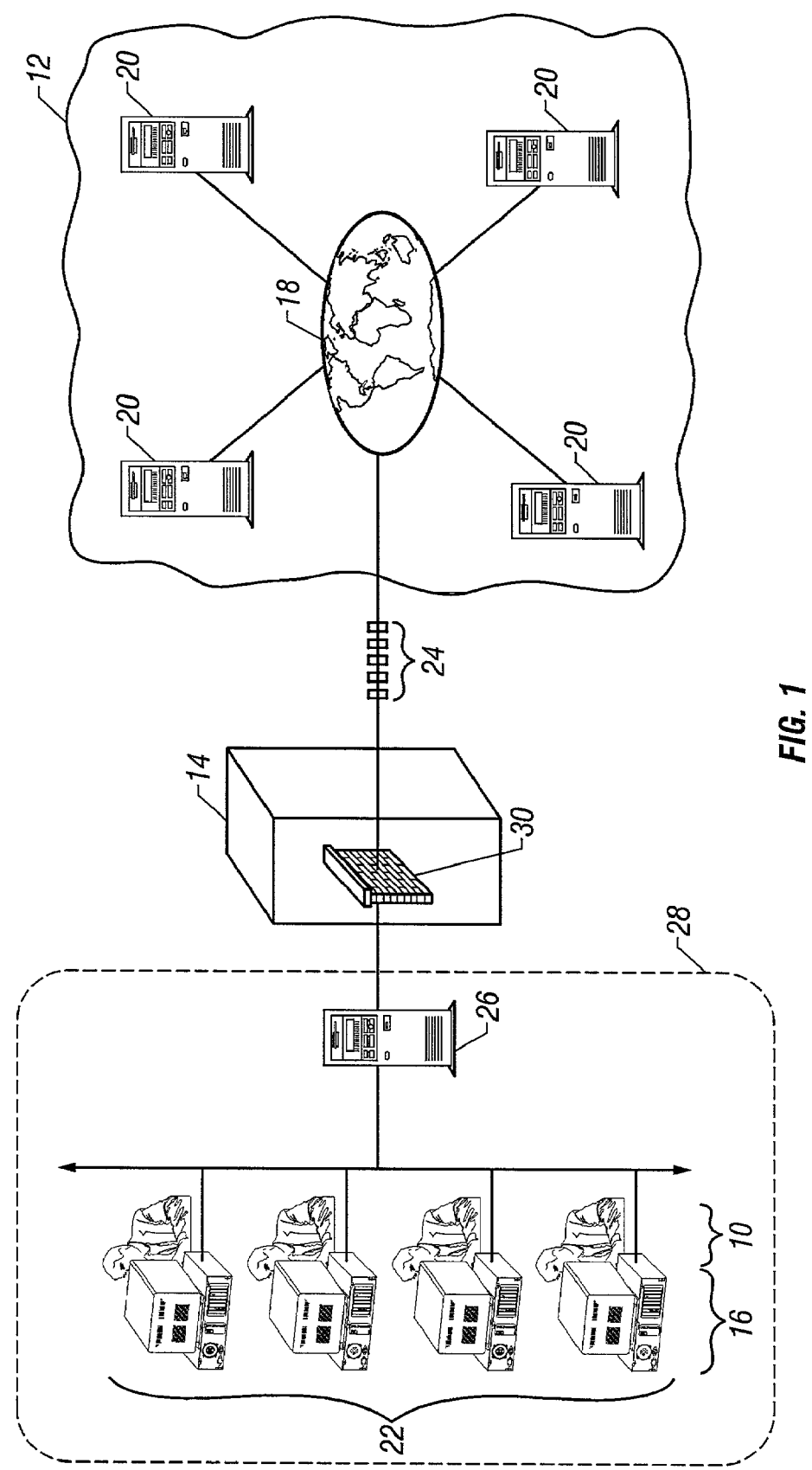
FIG. 1 illustrates a simplified network environment in which a preferred embodiment of the present invention may be practiced.

Referring now to FIG. 1, one or more users 10 access a public network 12 such as the Internet through an Internet Access Device such as an Application Level Gateway ("ALG") or other Internet Access Gateway ("IAG") 14. More specifically, the users 10 utilize a Web browser operative at a computing device such as a personal computer 16 to access the public network 12 by gaining access to the various electronic pathways 18 that interconnect the one or more external servers 20 that comprise the Internet, thereby establishing a session between a client 22 and server 20. A session is a protocol conversation between the client 22 and server 20 whereby various data packets 24 are exchanged therebetween. As well understood, information is conventionally transmitted and received in the form of these data packets 24.

Not uncommonly, the users 10 access the IAG 14 through a central server 26 that is part of an area network 28 such a local area network ("LAN") or wide area network ("WAN"). Accordingly, the IAG 14 may operate as a stand-alone machine connected between the area network 28 and public network 12, or it may be an integral component of the central server 26. In any event, all communication between the area network 28 and public network 12 pass through the IAG 14, which often comprises a firewall 30.

A "firewall" is a combination of hardware and software that prevents the internal components of the area network 28 from being accessed by the external components of the public network 12. Accordingly, the firewall 30 permits the internal components to interact with the external components without rendering the internal components susceptible to attack or unauthorized access. For example, while one internal component may host a publicly accessible application, such as a Web site, other internal components that contain other computing resources, such as internal network systems and data bases, are not intended for public access. Likewise, internal components should not be made vulnerable by accessing external components, such as Web Sites and other applications, from the public network 12. Thus, successful firewalls 30 alleviate such concerns by permitting authorized data packets 24 to pass therethrough while prohibiting other unauthorized data packets 24. Preferably, all data packets 24 flowing between the public network 12 and area network 28 pass through the firewall 30 to prevent circumventing security of the area network 28. And in addition to securing the boundary of the area network 28, the firewall 30 can, of course, also be used to control security within the area network 28.

A popular technique used by firewalls 30 to protect network components is known as packet filtering, whereby data packets 24 are permitted or prohibited from passing through the IAG 14 depending on whether they conform to a set of predefined rules. Conventionally, these rules are represented in tabular form for implementation by the IAG 14, and can be implemented as default-permit, whereby data packets 24 that are not expressly prohibited are permitted, or as default-prohibit, whereby data packets 24 that are not expressly permitted are prohibited. In addition, packet filtering can be implemented in a stateless fashion, whereby each data packet 24 is examined in isolation without regard to other data packets 24, or in a stateful fashion, whereby data packets 24 are examined in the context of a historical window of other data packets 24 from a common port, for example caching rule processing results for one or more data packets 24 and utilizing the cached results to subsequently bypass rule processing for similarly received later data packets 24. Another technique used by firewalls 30 to protect network components involves port monitoring, whereby the IAG 14 monitors the port on which it receives a data packet 24 from the public network 12. More specifically, each port is a numerically designated element contained in the addressing information of the data packet 24. It is used to indicate the nature of the service associated with that data packet 24. For example, a data packet 24 associated with a Telenet service is assigned port number "23," whereas a data packet 24 associated with the HyperText Transfer Protocol ("HTTP") service request is assigned port number "80". Via this implementation, when the IAG 14 receives a request to open a particular port for a particular type of session, a connection is ordinarily opened on that port.

Thus, an ordinary session begins when a client 22 makes a service request to an external server 20 on the public network 12, to which the server 20 responds by transmitting data packets 24 to the IAG 14. If the IAG 14 knows that one of the internal network components is expecting that data packet 24 from that server 20, then the IAG 14 permits that data packet 24 to flow to the central server 26 and into the area network 28. However, if the IAG 14 receives a data packet 24 from an external server 20 that is not expected by one of the internal components of the area network 28, then that data packet 24 could be associated with an attempted security breach into the area network 28, to which the IAG 14 would ordinarily discard the data packet 24 and thus thwart the attempt. On the other hand, it has become commonplace in certain protocols (e.g., streaming protocols, File Transfer Protocols ("FTP"), and video conferencing protocols such as H.323) for a primary session with a primary server 20 to generate one or more additional sessions with one or more additional servers 20 and the common client 22. For example, to properly service a client's service request on a primary server 20, the primary server 20 may need to employ the resources of secondary or other additional servers 20, from which the IAG 14 would not otherwise be expecting a legitimate data packet 24. Thus, it is desirable to configure the IAG 14 to permit additional data packets 24 associated with legitimate additional sessions to pass therethrough to the internal network components of the area network 28 without jeopardizing the security thereof.

Accordingly, a preferred method for managing dynamic network sessions will now be described. If the destination IP address of an incoming data packet 24 matches the IP address of an internal network component that is expecting the data packet 24, then the IAG 14 transmits the data packet 24 to that component. For example, when an input port receives a data packet 24, a software routine called a routing process is run. This routing process analyzes the addressing information contained within the data packet 24 to ascertain, among other things, the destination IP address of the internal network component to which that data packet 24 is directed. This routing process then compares this destination IP address against a data structure—such as table or other internal session table—that contains detailed information about the ports to which data packets 24 with various IP addresses should be sent. Based on information contained within the data structure, the data packet 24 is sent to the corresponding internal network element within the area network 28. If, on the other hand, however, the destination IP address of the incoming data packet 24 does not match the IP address of an internal network component that is expecting that data packet 24, then the IAG 14 queries whether the IAG 14 received the data packet 24 at an input port exceeding 1023.

If the IAG 14 did not receive the data packet 24 at an input port exceeding 1023, then the IAG 14 applies a default policy to the data packet 24 since the IAG 14 only receives data packets 24 from valid additional sessions at port numbers exceeding 1023, including port numbers equal to and greater than 1024. If, on the other hand, the IAG 14 received the data packet 24 at an input port exceeding 1023, then the IAG 14 may have received the data packet 24 from a legitimate additional session.

To verify whether the IAG 14 received the data packet 24 from a legitimate additional session, the IAG 14 queries another data structure—such as a table—that contains a list of Session Triggering Events. In simplified form, Session Triggering Events include trustworthy protocols that are known to be capable of generating dynamic or plural sessions, such as secondary and other additional sessions, between additional servers 20 and the original client 22, and their related port numbers. This list of Session Triggering Events is up-dated and maintained as necessary. For example, as new protocols are developed and identified as capable of generating dynamic or plural sessions, these protocols are added to the list. Significantly, the inventive arrangements thus support not only existing dynamic protocols, but also dynamic protocols that have yet been created, but which are effortlessly added to the list of Session Triggering Events at a time-subsequent. As a result, it is not necessary that complex protocol decoders be developed or added to the IAG 14 for the new protocols. Rather, the IAG 14 makes security decisions without having to decode the unrecognized data packets 24, but with reference to Session Triggering Events listed in conjunction with port numbers on which the data packets 24 are received.

If the IAG 14 did not receive the data packet 24 from a listed Session Triggering Event, then the IAG 14 applies a default policy to the data packet 24. If, on the other hand, the IAG 14 did receive the data packet 24 from a listed Session Triggering Event, then the IAG 14 queries whether any of the internal network components will accept the data packet 24. Preferably, the IAG 14 applies an activity limitation, such as a finite period of time, to the internal network components to assist in making this determination. For example, if an internal network component has not been active within, say, thirty seconds, then the IAG 14 does not transmit the data packet 24 to that network component, as security for that data packet 24 as directed for that internal network component, may have been compromised. In any event, if Network Address Translation ("NAT") is not enabled on the IAG 14, then the IAG 14 preferably polls the internal network component corresponding to the destination IP address of the data packet 24 to query whether that internal network component will receive the data packet 24. If, on the other hand, NAT is enabled on the IAG 14, then four preferred methods query whether an internal network component will receive the data packet 24, including two-way communication protocols, port-probing, Simple Network Management Protocol ("SNMP") queries, and intranet host tracking and management protocols, each of which will be described below.

As known, NAT is a technique used to hide internal IP addresses of network components from the external components of a public network 12. More specifically, all network components that are addressable over the Internet have an IP address consisting of four octets separated by periods. Each octet is an eight bit sequence representing a decimal number between zero and 255. For example, the central server 24 may have an IP address of 12.152.96.8. The IP utilizes the numeric IP addresses to route data between network components, which are ordinarily established by a hierarchy of domains (i.e., grouping of various computers on the Internet) comprising easily recognized letters, words, and phrases (e.g., www.uspto.gov) instead of numbers, whereby a Domain Name Server commonly shoulders the burden of converting between textual and numeric IP addresses since the latter tax human memory capabilities. In any event, under NAT, the internal network components share one or more common IP addresses (e.g., the IP address of the central server 24), which are the only IP addresses that the area network 28 shares with the public network 12 on behalf of its internal components. Thus, all communications to the internal components of the area network 28 are sent and received via the common IP addresses, thereby protecting the true IP addresses of the internal components, whereby the data packets 24 are mapped according to NAT tables that are internally maintained and protected by the IAG 14 or central server 26 to privately maintain the true IP addresses of the internal components as a security measure within the area network 28. By shielding the true IP addresses of the internal network components, the external number of separate IP addresses that must be maintained by the IAG 14 is minimized.

In any event, if no internal network components are willing to receive the data packet 24, then the IAG 14 applies a default policy to the data packet 24. If, on the other hand, an internal network components is willing to receive the data packet 24, then the IAG 14 transmits the data packet 24 to that network component corresponding to the destination IP address of the data packet 24.

In this way, the IAG 14 maintains security on incoming data packets 24 without decoding the data packets 24. Rather, the IAG 14 verifies that the IAG 14 received the data packet 24 at an input port exceeding 1023, received the data packet 24 from a listed Session Triggering Event, and that an internal network component is willing to receive the data packet 24. These steps preclude the IAG 14 from forwarding untrustworthy data packets 24 to unsuspecting network components, thereby preventing compromised security of the area network 28, and allows the IAG 14 to treat the primary session and all additional sessions as a group, whereby security policy, resource allocation policy, and scheduling policy are defined for the group instead of each individual session. For example, the firewall 30 applies the same security policy to the additional session as the primary control session, NAT creates a dynamic mapping in its session table with the same internal IP address, scheduler applications apply the same bandwidth limitations and priority settings to the secondary sessions, and so forth.

Figure 2:
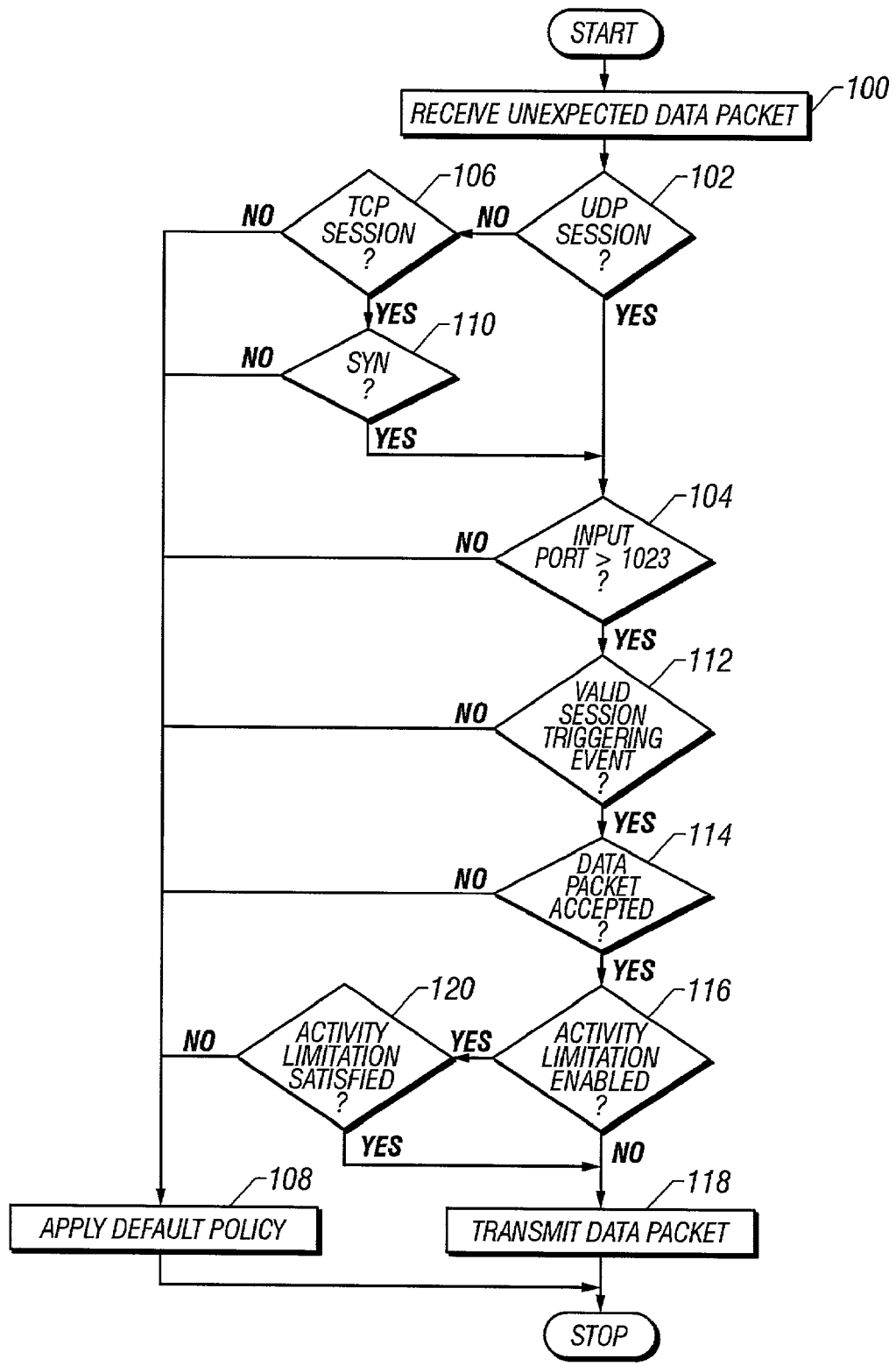
FIG. 2 is a representative flow diagram depicting a preferred process for managing dynamic network sessions at the IAG of FIG. 1.

The above protocol is further illustrated with reference now to FIG. 2, in which dynamic network session management is employed at an IAG 14 receiving an unexpected data packet 24 from a public network 12 at step 100, after which control passes to step 102 as the inventive systems and methods progress. From step 102, control passes to step 104 if the primary session is a UDP session; otherwise, control passes from step 102 to step 106. From step 106, control passes to step 108 if the primary session is a not a TCP session; otherwise, control passes from step 106 to step 110. In step 108, the IAG 14 applies the applicable default policy to the unexpected data packet, e.g., discarding it without permitting it to pass to the central server 26 of the area network 28. If a session is not a UDP or TCP session, then the default policy is applied to the data packet 24 by this step 108. On the other hand, from step 110, control passes to step 104 if the Synchronization ("SYN") bit is active; otherwise, control passes from step 110 to step 108 as previously described. If the incoming data packet 24 is associated with a TCP session, the TCP SYN bit is the only flag enabled in the TCP header information because, as known, the TCP handshake protocol requires that the SYN packet is the first data packet 24 sent in a TCP session. In any event, from step 104, control passes to step 112 if the input port exceeds 1023; otherwise, control passes from step 104 to step 108. From step 112, control passes to step 114 if the primary session is listed as a valid Session Triggering Event; otherwise, control passes from step 112 to step 108. From step 114, control passes to step 116 if one of the internal components indicate willingness to accept the data packet 24; otherwise, control passes from step 114 to step 108. From step 116, control passes to step 118 if an activity limitation is not enabled; otherwise control passes from step 116 to step 120. From step 120, control passes to step 118 if the activity limitation is satisfied; otherwise, control passes from step 120 to step 108. In step 118, the IAG 14 transmits the data packet 24 to the internal network component that expressed willingness to accept the data packet, according to which the IAG 14 has securely accepted an unexpected data packet 24 received at the area network 28 in conjunction with a valid additional session generated by a previously existing session between a client 22 and server 20.

As previously alluded to, four preferred methods query whether an internal network component will receive the data packet 24 when NAT is enabled on the IAG 14, including two-way communication protocols, port-probing, SNMP queries, and intranet host tracking and management protocols. More specifically, when NAT is enabled on the IAG 14, internal network components involved with passing data to the control server 26 share one or more common external IP addresses as described. The internal IP addresses of the respective network components is known only to, and protected by, the IAG 14. In any event, the incoming data packet 24 typically specifies only the external IP address, as the internal IP address is not known thereto. Thus, the IAG 14 transmits the data packet 24 to an appropriate network component according to the IAG's 14 specified protocol for doing so, thus determining which, if any, of the active network components will receive the data packet 24.

As described, the first preferred method of querying whether an active network component will receive the data packet 24 involves two-way communication between the IAG 14 and respective network components. More specifically, software is installed at the personal computer 16 of the client 22 to track relevant socket-level activities. Thus, when the firewall 30 sends a query request message comprising addressing information—including, for example, the sender and receiver IP addresses, transport type, TCP/UDP fields, port numbers, etc.—extracted from the data packet 24 to each of the internal network components, the components know whether a TCP/UDP port is opened on the firewall 30, and respond whether they expect or will accept the data packet 24 based on current activities. If the response is positive, the IAG 14 associates the incoming session with the primary control session to which it is related. If, on the other hand, no network components expect or will accept the data packet 24, then the IAG 14 applies the default policy to the data packet 24. By techniques known in the art, the IAG 14 can communicate with the internal network components sequentially, simultaneously, or otherwise via this two-way communication protocol.

A second preferred method of querying whether an active network component will receive the data packet 24 involves port probing active network component to ascertain which ports thereon are open. More specifically, the inventive arrangements permit various kinds of known TCP and UDP port-probing to be used between the IAG 14 and active network components. For example, for each active network component, the IAG 14 probes relevant target ports on the network components. If a target port is open, the IAG 14 concludes it has located the network component corresponding to the unexpected data packet 24, and associates the incoming session on that network component with the primary control session to which it is related.

Figure 3:
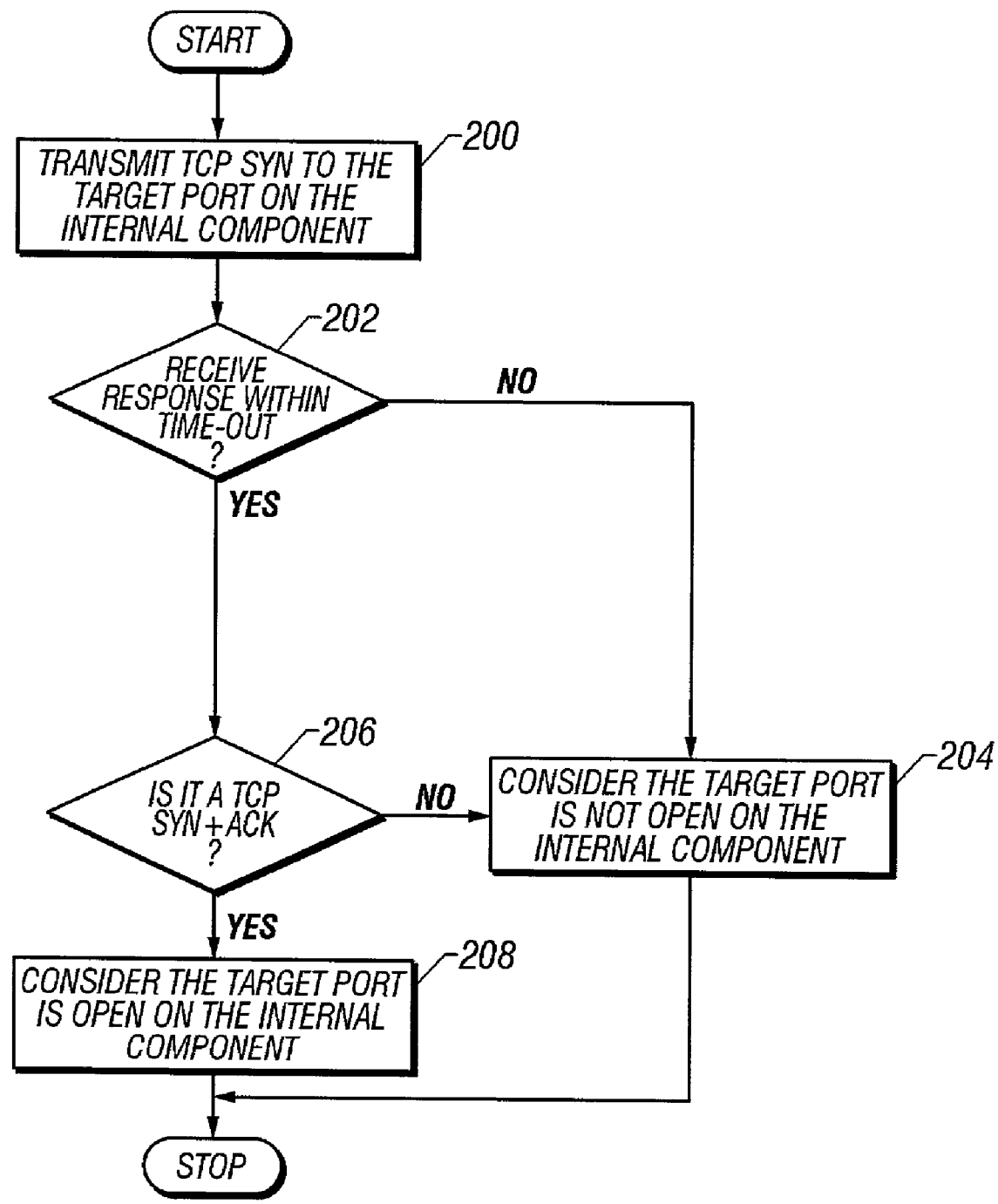
FIG. 3 is a representative flow diagram depicting a preferred process for TCP port probing.

More specifically, and referring now to FIG. 3., a preferred method of TCP port probing is illustrated, in which the IAG 14 transmits a TCP SYN packet to the target TCP port on the internal network component in step 200, after which control passes to step 202. From step 202, control passes to step 204 if the IAG 14 fails to receive a response from the internal component within a pre-defined time-out period, if any, such as 2-3 seconds, whereby if no response is received from the network component within the pre-defined time-out period, the IAG 14 concludes the target port on that internal component is not open; otherwise, control passes from step 202 to step 206 if the IAG 14 received a response from the internal component, whereby the IAG 14 concludes the target port on that internal component is open. From step 206, control passes to step 204 if the TCP response received from the internal component did not contain SYN and acknowledgment ("ACK") bits, whereby the IAG 14 concludes the target port on that internal component is not open; otherwise, control passes from step 206 to step 208, wherefrom the IAG 14 concludes that the target TCP port is open on the internal component and thus expecting the incoming additional session. This is because the TCP implementation on the internal components acknowledge the TCP SYN packet by sending back to the IAG 14 a TCP packet with both the SYN and ACK bits set if it is willing to establish a TCP session. Alternatively, if the Reset ("RST") bit is the only bit set in the reply, the IAG 14 concludes the target is not open on the internal component of the area network 28, as shown in step 204.

Figure 4:
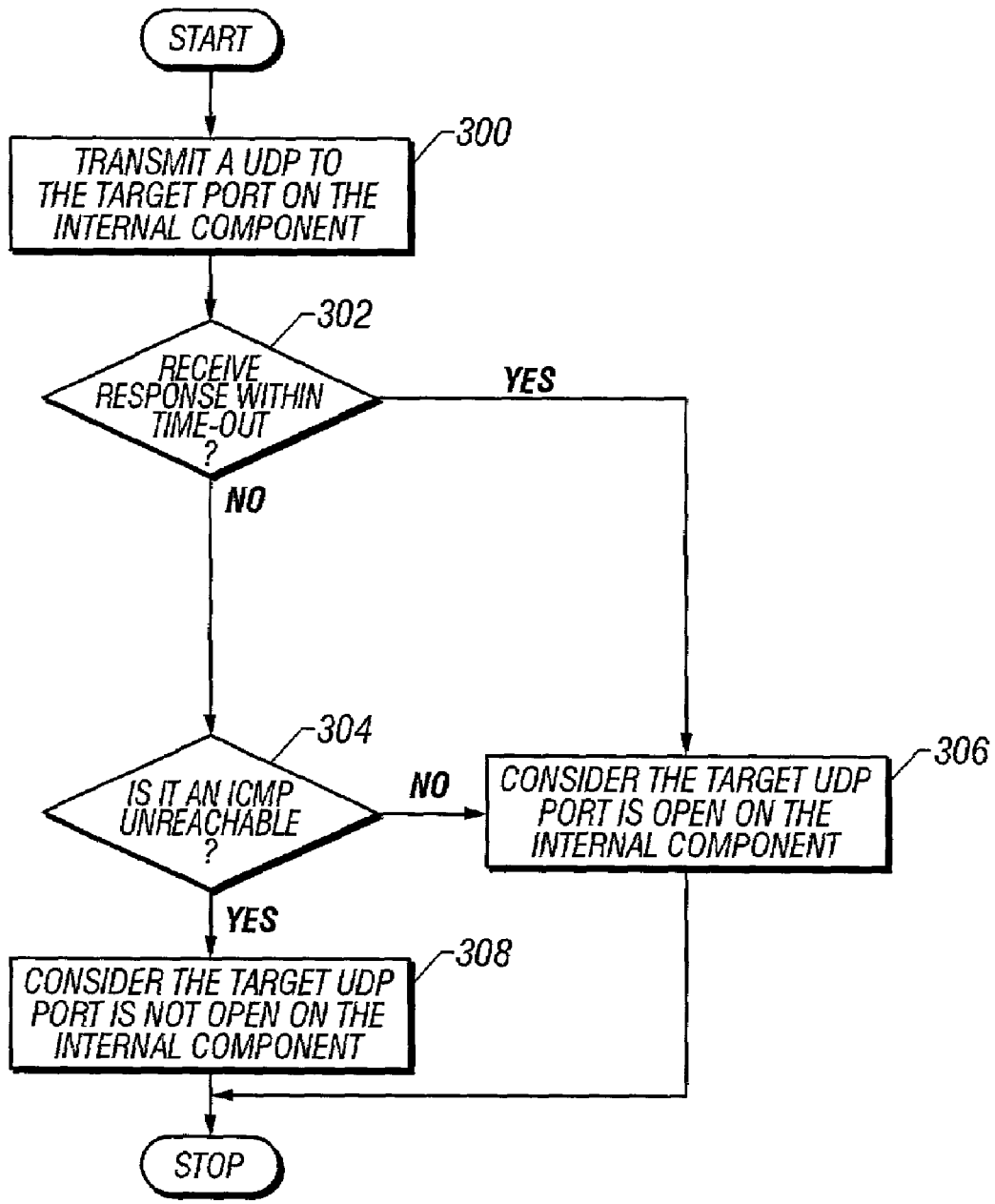
FIG. 4 is a representative flow diagram depicting a preferred process for UDP port probing.

Similarly, and referring now to FIG. 4, a preferred method of UDP port probing is illustrated, in which the IAG 14 transmits a UDP packet—with no payload data—to the target UDP port on the internal network component in step 300, after which control passes to step 302. From step 302, control passes to step 304 if the IAG 14 fails to receive a response from the internal component within a pre-defined time-out period, if any, such as 2-3 seconds; otherwise, control passes from step 302 to step 306, whereby if the response is received from the network component within the pre-defined time-out period, the IAG 14 concludes the target port on that internal component is open. From step 304, control passes to step 308 if the response is an Internet Control Message Protocol ("ICMP") Port Unreachable or equivalent response, whereby the IAG 14 concludes the target port on that internal component is not open; otherwise, control passes 304 to step 306 if the response is not an ICMP Port Unreachable or equivalent response, whereby the IAG 14 concludes the target port on that internal component is open. This is because if the UDP response is a UDP packet from the target port on the internal component, the IAG 14 concludes the target UDP port on the internal component is open.

A third preferred method of querying whether an active network component will receive the data packet involves retrieving the TCP/IP status of the network component via SNMP queries. More specifically, SNMP refers generally to a set of protocols for managing complex networks. SNMP works by sending messages—called protocol data units—to different parts of a network such as the internal components of the area network 28. SNMP-compliant components, such as the preferred clients 22, store data about themselves in Management Information Bases and return this data in response to SNMP queries. Thus, for example, dependent on whether an incoming data packet 24 is part of a TCP or UDP session, the IAG 14 retrieves the respective TCP connection table (SNMP::tcpConnTable) or UDP connection table (SNMP::udpConnTable) via a standard SNMP query. These tables include information on currently active sessions and opened ports on the internal components of the area network 28. Based on the information in the tables, the IAG 14 determines whether an internal component is expecting the incoming data packet 24. If the response is positive, the IAG 14 associates the incoming session with the primary control session to which it is related. If, on the other hand, no network components expect or will accept the data packet 24, then the IAG 14 applies the default policy to the data packet 24. By techniques known in the art, the IAG 14 can communicate with the internal network components sequentially, simultaneously, or otherwise via these SNMP queries. Via this embodiment, the IAG 14 retrieves the current TCP/IP or UDP/IP status of the internal network components via SNMP queries.

Finally, a fourth preferred method of querying whether an active network component will receive the data packet involves intranet host tracking and management protocols operative within the area network 28. More specifically, instead of probing or querying the internal components every time a data packet is received 24, the IAG 14 continually tracks the TCP/IP and UDP/IP status of the internal components. This can be accomplished in several ways. For example, a snapshot of the status of the internal components can be taken at predetermined time intervals, such as every 60 seconds or so. In conjunction therewith, the IAG 14 maintains a data structure—such as Network Status Table or other internal session table—in which each entry contains the SNMP::tcpConnTable or SNMP::udpConnTable objects. This can be accomplished via a separate thread—such as a Network Status Tracking Thread—which is responsible for collecting information about each active network component, or alternatively, any appropriate multi-task programming technique useful for the same purpose, such as a timer callback. In any event, when the IAG 14 receives an unexpected data packet 24, it attempts to identify all possible session entries. For each session entry, the IAG 14 utilizes the internal component's status entry to make a decision, whereby if the target port is open on that internal component, the data packet 24 is transmitted to that component; otherwise, if the target port is not open on that internal component, the data packet 24 is not transmitted to that component. Via this embodiment, the IAG 14 tracks the TCP/IP or UDP/IP status of each internal network component by taking periodic snapshots of the area network 28 via SNMP queries. This embodiment can, of course, also be combined with the afore-described port-probing to achieve timely and highly accurate information about the area network 28.

The inventive arrangements can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the described methods. The present invention can also be embedded in a computer program product that comprises the features enabling the implementation of the described methods, and which—when loaded into a computer system—is able to carry out the described methods. In general, a computer program in the present context refers to any expression, in any language, code, or notation, of a set of instructions intended to cause a system having an information processing capability to perform a particular function either directly or after or both of the following: i) conversion into another language, code, or notation, or ii) reproduction in a different material form.

In addition, the spirit and scope of the present invention is not limited to any of the various embodiments described above. Rather, details and features of exemplary and preferred embodiments were disclosed. Without departing from the spirit and cope of this invention, other modifications will therefore be apparent to those skilled in the art. Thus, it must be understood that the detailed description of the invention and drawings were intended as illustrative only, and not by way of limitation.

What is claimed is:

1. A method operative at an Internet access gateway operative between an area network and a public network for processing a dynamic network session between said area network and said public network when a primary server of said public network in a primary session with a client of said area network initiates an additional session with an additional server of said public network and said client, said method comprising steps of:
receiving a data packet at said gateway from said additional server; and
processing said packet provided i) said gateway received said packet at an input port exceeding 1023, ii) said additional session comprises a pre-defined Session Triggering Event, and iii) at least one internal network component of said area network indicates willingness to receive said packet, wherein said gateway otherwise applies a default process to said packet.

2. The method of claim 1 wherein processing said packet comprises transmitting said packet to said component indicating said willingness to receive said packet.

3. The method of claim 1 wherein said default process comprises discarding said packet.

4. The method of claim 1 wherein said component indicates said willingness to receive said packet via a two-way communication protocol operative between said component and said gateway.

5. A method operative at an Internet access gateway operative between an area network and a public network for processing a dynamic network session between said area network and said public network when a primary server of said public network in a primary session with a client of said area network initiates an additional session with an additional server of said public network and said client, said method comprising steps of:
receiving a data packet at said gateway from said additional server; and
processing said packet provided i) said aateway received said packet at an input port exceeding 1023, ii) said additional session comprises a pre-defined Session Ttiggering Event, and iii) at least one internal network component of said area network indicates willingness to receive said packet, wherein said component indicates said willingness to receive said packet via port probing from said gateway.

6. The method of claim 5 wherein said port probing comprises TCP port probing.

7. The method of claim 5 wherein said port probing comprises UDP port probing.

8. A method operative at an Internet access gateway operative between an area network and a public network for processing a dynamic network session between said area network and said public network when a primary server of said public network in a primary session with a client of said area network initiates an additional session with an additional server of said pablic network and said client, said method comprising steps of:
receiving a data packet at said gateway from said additional server; and
processing said packet provided i) said gateway received said packet at an input port exceeding 1023, ii) said additional session comprises a pre-defined Session Triggering Event, and iii) at least one internal network component of said area network indicates willingness to receive said packet, wherein said component indicates said willingness to receive said packet via one or more SNMP queries.

9. A method operative at an Internet access gateway operative between an area network and a public network for processing a dynamic network session between said area network and said public network when a primary server of said public network in a primary session with a client of said area network initiates an additional session with an additional server of said public network and said client, said method comprising steps of:
receiving a data packet at said gateway from said additional server; and
processing said packet provided i) said gateway received said packet at an input port exceeding 1023, ii) said additional session comprises a pre-defined Session Triggering Event, and iii) at least one internal network component of said area network indicates willingness to receive said packet, wherein said component indicates said willingness to receive said packet via an intranet host tracking protocol comprising periodic snapshots of said area network via one or more SNMP inquiries.

10. A method operative at an Internet access gateway operative between an area network and a public network for processing a dynamic network session between said area network and said public network when a primary server of said public network in a primary session with a client of said area network initiates an additional session with an additional server of said public network and said client, said method comprising steps of:
receiving a data packet at said gateway from said additional server; and
processing said packet provided i) said gateway received said packet at an innut port exceeding 1023, ii) said additional session comprises a pre-defined Session Triggering Event, and iii) at least one internal network component of said area network indicates willingness to receive said packet, wherein said component indicates said willingness to receive said packet within a predetermined activity limitation.

11. The method of claim 10 wherein said predetermined activity limitation comprises a finite period of time.

12. A method operative at an Internet access gateway operative between an area network and a public network for processing a dynamic network session between said area network and said public network when a primary server of said public network in a primary session with a client of said area network initiates an additional session with an additional server of said public network and said client, said method comprising steps of:
receiving a data packet at said gateway from said additional server; and
processing said packet provided i) said gateway received said packet at an input port exceeding 1023, ii) said additional session comprises a pre-defined Session Triggering Event, and iii) at least one internal network component of said area network indicates willingness to receive said packet, wherein said packet is processed as if transmitted from said primary server to said gateway.

13. The method of claim 1 wherein said gateway treats said primary session and said additional session as a group.

14. The method of claim 13 wherein said gateway applies a single security policy to said group.

15. The method of claim 13 wherein said gateway applies a single resource allocation policy to said group.

16. The method of claim 13 wherein said gateway applies a single scheduling policy to said group.

17. The method of claim 1 wherein said Session Trigger Event comprises a trusted protocol known to be reliable in generating dynamic network sessions.

18. A computer-readable storage medium containing computer executable code for instructing an Internet access gateway operative between an area network and a public network to operate as follows when processing a dynamic network session between said area network and said public network when a primary server of said public network in a primary session with a client of said area network initiates an additional session with an additional server of said public network and said client:

receive a data packet at said gateway from said additional server;

and process said packet provided i) said gateway received said packet at an input port exceeding 1023, ii) said additional session comprises a pre-defined Session Triggering Event, and iii) at least one internal network component of said area network indicates willingness to receive said packet, wherein said executable code instructs said gateway to otherwise apply a default process to said packet.

19. The computer-readable storage medium of claim 18 wherein said executable code instructs said gateway to transmit said packet to said component indicating said willingness to receive said packet.

20. The computer-readable storage medium of claim 18, wherein said executable code instructs said gateway to discard said packet.

21. The computer-readable storage medium of claim 18 wherein said executable code instructs said gateway to process said packet as if transmitted from said primary server to said gateway.

22. The computer-readable storage medium of claim 18 wherein said executable code instructs said gateway to treat said primary session and said additional session as a group.

* * * * *